(12) United States Patent
Park

(10) Patent No.: US 11,274,586 B2
(45) Date of Patent: Mar. 15, 2022

(54) EXHAUST GAS PURIFICATION APPARATUS AND METHOD FOR CONTROLLING THE SAME

(71) Applicants: Hyundai Motor Company, Seoul (KR); Kia Motors Corporation, Seoul (KR)

(72) Inventor: Jun Sung Park, Seongnam-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 4 days.

(21) Appl. No.: 17/085,648

(22) Filed: Oct. 30, 2020

(65) Prior Publication Data

US 2022/0010708 A1    Jan. 13, 2022

(30) Foreign Application Priority Data

Jul. 8, 2020    (KR) .................. 10-2020-0084111

(51) Int. Cl.
*F01N 3/10* (2006.01)
*F01N 3/20* (2006.01)

(52) U.S. Cl.
CPC ............... *F01N 3/101* (2013.01); *F01N 3/20* (2013.01); *F01N 2370/04* (2013.01); *F01N 2560/025* (2013.01)

(58) Field of Classification Search
CPC ............... F01N 3/101; F01N 2560/025; F01N 2900/1624; F01N 11/007; F01N 11/00; F01N 3/0864; F01N 2570/16; F01N 3/20; F01N 3/18; F01N 13/009; F02D 41/1454; F02D 2200/0814; B01D 2255/908
See application file for complete search history.

(56) References Cited

U.S. PATENT DOCUMENTS

| | | | |
|---|---|---|---|
| 8,464,522 B2 * | 6/2013 | Fujiwara | F02D 41/029 60/285 |
| 9,394,844 B2 * | 7/2016 | Hubbard | F01N 3/035 |
| 10,859,018 B1 * | 12/2020 | Lee | F01N 3/101 |
| 11,193,411 B2 * | 12/2021 | Paukner | F01N 3/101 |
| 2010/0205942 A1 * | 8/2010 | Fujiwara | F02D 41/029 60/285 |
| 2011/0072784 A1 * | 3/2011 | Hepburn | F01N 3/101 60/285 |
| 2018/0355824 A1 * | 12/2018 | Springer | F02M 26/22 |

* cited by examiner

*Primary Examiner* — Anthony Ayala Delgado
(74) *Attorney, Agent, or Firm* — Morgan, Lewis & Bockius LLP

(57) ABSTRACT

A method for controlling an exhaust gas purification apparatus including a front three-way catalyst (TWC) and a rear TWC that purify the exhaust gas may include determining an oxygen flow rate and a flow rate of a reducing agent introduced into the front TWC, determining the oxygen storage amount of the front TWC based on the oxygen flow rate and the flow rate of the reducing agent flowing into the front TWC, determining a maximum oxygen storage amount of the front TWC, determining a slip oxygen flow rate and a slip reducing agent flow rate of the front TWC, determining an oxygen storage amount of the rear TWC, comparing a rear TWC oxygen storage amount and a target value of the rear TWC oxygen storage amount, and maintaining a catalyst purge of the front TWC when the rear TWC oxygen storage amount is greater than the target value of the rear TWC oxygen storage amount.

27 Claims, 2 Drawing Sheets

EXHAUST GAS PURIFICATION APPARATUS AND METHOD FOR CONTROLLING THE SAME

CROSS-REFERENCE TO RELATED APPLICATION

The present application claims priority to Korean Patent Application No. 10-2020-0084111 filed on Jul. 8, 2020, the entire contents of which is incorporated herein for all purposes by this reference.

BACKGROUND OF THE INVENTION

Field of the Invention

The present invention relates to an exhaust gas purification apparatus and method for controlling the same. More particularly, the present invention relates to an exhaust gas purification apparatus and method for controlling the same configured for effectively removing toxic gases discharged from an internal combustion engine by predicting the amount of oxygen and reducing agent flowing into the three-way catalyst and purging the catalyst based on this.

Description of Related Art

Recently, as the use of vehicles increases and the traffic volume increases, the problem of air pollution due to exhaust gas has emerged as a serious social problem.

Accordingly, governments of each country have set emission standards for pollutants in exhaust gases such as carbon monoxide (CO), hydrocarbons (HC), and nitrogen oxides (NOx) to regulate the amount of exhaust gas, and these exhaust gas regulations are gradually strengthening.

Furthermore, each vehicle manufacturer is making great efforts to effectively respond to the ever tightening emission gas regulations, and new vehicles are being produced in accordance with emission standards.

in vehicles, to meet emission standards, a three-way catalyst converter carrying a precious metal is provided in the exhaust system to accelerate the decomposition of hydrocarbons, oxidation of carbon monoxide, and reduction of nitrogen oxides.

The three-way catalyst refers to a catalyst that removes these compounds by simultaneously reacting with hydrocarbon-based compounds, carbon monoxide and nitrogen oxides (NOx), which are harmful components of exhaust gas, and mainly Pt/Rh, Pd/Rh or Pt/Pd/Rh Is used.

Furthermore, the three-way catalyst performs reducing carbon monoxide and hydrocarbons and reducing nitrogen oxides according to fluctuations in lean (excessive oxygen) and rich (excessive fuel) states based on the exhaust gas air-fuel ratio.

On the other hand, in the fuel cut state, unburned air passes through the three-way catalyst and oxygen is stored in the three-way catalyst, and when the fuel is re-injected, the nitrogen oxide purification performance is locally degraded by the stored oxygen. For the present purpose, it performs a catalyst purge function to rapidly consume oxygen by injecting excessive fuel when re-injecting fuel.

Such a three-way catalyst may include a three-way catalyst and a three-way catalyst. In the case of the three-way catalyst, the control is difficult because an oxygen sensor is not basically provided at the rear of the three-way catalyst, and the reality is that the catalyst purging of the three-way catalyst is not separately executed.

The previously constructed three-way catalyst purge control logic also performs the three-way catalyst purging by estimating the oxygen storage amount in the three-way catalyst based on the accumulated air volume flowing into the three-way catalyst. However, it is different from actual chemical phenomena, such as resetting the oxygen storage value when entering the fuel cut-off section.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing an exhaust gas purification apparatus and a method for controlling the same configured for improving the exhaust gas purification performance of an internal combustion engine and a control method thereof by controlling the amount of oxygen and reducing agent introduced into the three-way catalyst to be predicted based on physical quantity and by performing the catalyst purging based on the present prediction and controlling the catalyst purge to be terminated based on the air-fuel ratio information received from the oxygen sensor and the oxygen storage amount of the downstream three-way catalyst.

A method for controlling an exhaust gas purification apparatus including a front three-way catalyst (TWC) and a rear TWC that purify the exhaust gas discharged from the internal combustion engine according to various exemplary embodiments of the present invention includes determining an oxygen flow rate and a flow rate of a reducing agent introduced into the front TWC, determining the oxygen storage amount of the front TWC based on the oxygen flow rate and the flow rate of the reducing agent flowing into the front TWC, determining a maximum oxygen storage amount of the front TWC, determining a slip oxygen flow rate and a slip reducing agent flow rate of the front TWC, determining an oxygen storage amount of the rear TWC, comparing a rear TWC oxygen storage amount and a target value of the rear TWC oxygen storage amount, and maintaining a catalyst purge of the front TWC when the rear TWC oxygen storage amount is greater than the target value of the rear TWC oxygen storage amount.

In the determining an oxygen flow rate and a flow rate of a reducing agent introduced into the front TWC, the oxygen flow rate may be determined based on the flow rate of the exhaust gas discharged from the combustion chamber of the internal combustion engine and the concentration of oxygen, and the flow rate of the reducing agent may be determined based on the flow rate and an air-fuel ratio of the exhaust gas discharged from the combustion chamber of the internal combustion engine.

The oxygen flow rate may be determined by the following [Equation 1], and the flow rate of the reducing agent may be determined by the following [Equation 2].

$$m_{O2} = m \times C_{O2} \qquad \text{[equation 1]}$$

$$m_{red.} = m \times (1 - 1/\lambda) \qquad \text{[equation 2]}$$

Here, mO2 is the flow rate of the oxygen flowing into the front TWC, m is the flow rate of the exhaust gas discharged from the combustion chamber of the internal combustion engine, $C_{O2}$ is the concentration of oxygen discharged from the combustion chamber of the internal combustion engine, $m_{red}$ is the flow rate of reducing agent entering the front TWC, and λ is the air-fuel ratio. Furthermore, $C_{O2}$ may be replaced with an equation of (1−1/λ), $m_{O2}$ always has a value greater than or equal to 0, and $m_{red}$ always has a value less than or equal to 0.

In determining the oxygen storage amount of the front TWC, the front TWC oxygen storage amount may be determined through time integration of the sum of the oxygen flow rate and the flow rate of the reducing agent introduced into the front TWC when an air-fuel ratio of a rear end portion of the front TWC is equal to or less than 1.

In the determining a maximum oxygen storage amount of the front TWC, the maximum oxygen storage amount of the front TWC may be determined as the oxygen storage amount of the front TWC at the moment when the oxygen sensor signal provided at the rear end portion of the front TWC exceeds 1 air-fuel ratio.

In the determining a slip oxygen flow rate and a slip reducing agent flow rate of the front TWC, the slip oxygen flow rate of the front TWC may be determined as the oxygen flow rate introduced into the front TWC when the air-fuel ratio of the rear end portion of the front TWC is greater than 1, and may be determined as 0 when the air-fuel ratio at the rear end portion of the front TWC is not greater than 1.

In the determining a slip oxygen flow rate and a slip reducing agent flow rate of the front TWC, the slip reducing agent flow rate of the front TWC may be determined as the flow rate of the reducing agent introduced into the front TWC when the oxygen storage amount in the front TWC is not greater than a reference oxygen storage amount, and may be determined as 0 when the oxygen storage amount of the front TWC is greater than the reference oxygen storage amount.

The reference oxygen storage amount is set as a maximum oxygen storage amount of the front TWC.

In determining an oxygen storage amount of the rear TWC, the oxygen storage amount of the rear TWC may be determined as a time integral of a sum of the slip oxygen flow rate and the slip reducing agent flow rate of the front TWC or a maximum oxygen storage amount of the rear TWC.

The oxygen storage amount of the rear TWC may be determined as a time integral of the sum of the slip oxygen flow rate of the front TWC and the slip reducing agent flow rate when the oxygen storage amount of the rear TWC is not greater than the target value of the rear TWC oxygen storage amount, and may be determined as the maximum oxygen storage amount of the rear TWC when the oxygen storage amount of the rear TWC is greater than the target oxygen storage amount of the rear TWC.

Meanwhile, an exhaust gas purification apparatus including a three-way catalyst (TWC) that purifies the exhaust gas discharged from the internal combustion engine according to various exemplary embodiments of the present invention includes a first oxygen sensor provided in an exhaust line at a rear end portion of the combustion chamber of the internal combustion engine, a front TWC mounted in the exhaust line at a rear end portion of the first oxygen sensor, a second oxygen sensor provided in an exhaust line at a rear end portion of the front TWC, a rear TWC mounted in the exhaust line at a rear end portion of the second oxygen sensor, and a control unit configured of determining an oxygen storage amount of the front TWC and the rear TWC, and controlling to maintain a front TWC catalyst purge when the oxygen storage amount of the rear TWC is greater than a target TWC oxygen storage amount of the rear TWC.

The exhaust gas purification apparatus according to various exemplary embodiments of the present invention may further include an exhaust gas flow sensor provided in an exhaust line in front of the front TWC to detect a flow rate of the exhaust gas and a first oxygen sensor to detect an air-fuel ratio of the exhaust gas, and a second oxygen sensor provided in the exhaust line at the rear end portion of the front TWC to detect an oxygen concentration of the exhaust gas.

The exhaust gas flow rate may be determined through modeling by the control unit.

The control unit may determine a flow rate of oxygen and a flow rate of a reducing agent introduced into the front TWC, determine a slip oxygen flow rate and a slip reducing agent flow rate of the front TWC, determine the oxygen storage amount of the rear TWC, and control to maintain a front TWC catalyst purge when the rear TWC oxygen storage amount is greater than the target value of the rear TWC oxygen storage amount.

The oxygen flow rate may be determined based on the flow rate of the exhaust gas discharged from the combustion chamber of the internal combustion engine and the concentration of oxygen, and the flow rate of the reducing agent may be determined based on the flow rate and an air-fuel ratio of the exhaust gas discharged from the combustion chamber of the internal combustion engine.

The oxygen storage amount of the front TWC may be determined by time integration of a sum of the oxygen flow rate and the flow rate of the reducing agent flowing into the front TWC.

The oxygen storage amount of the rear TWC may be determined as a time integral of a sum of the slip oxygen flow rate and the slip reducing agent flow rate of the front TWC or a target oxygen storage amount of the rear TWC.

The target value of the rear TWC oxygen storage may be set to a level of 5-70% of the maximum oxygen storage of the rear TWC, may be set differently according to the operation conditions of the internal combustion engine, catalyst temperature, and exhaust flow rate.

In the front TWC and the rear TWC, the purifying performance of carbon monoxide and hydrocarbons may be improved in a lean atmosphere, and the purifying performance of nitrogen oxides may be improved in a rich atmosphere.

The front TWC and the rear TWC may include one or more of ceria, zirconia, platinum, palladium, rhodium, zeolite, alumina, gold, titania, manganese, or a combination thereof.

The front TWC and the rear TWC may contain a nitrogen oxide storage material.

The rear TWC may perform a function by being coated on a particulate matter filter device.

The rear TWC maximum oxygen storage amount may be set as a reference value based on the rear TWC oxygen storage capacity evaluation data, or may be set by multiplying the maximum oxygen storage amount of the front TWC by a volume ratio when it has similar chemical/physical properties to the front TWC.

According to various exemplary embodiments of the present invention, it is possible to improve the exhaust gas purification performance of the internal combustion engine by predicting the amount of oxygen and reducing agent flowing into the rear TWC, purging the catalyst based on this, and controlling the catalyst to end portion purging based on the information on the air-fuel ratio received from the rear oxygen sensor and the amount of oxygen stored in the rear TWC.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
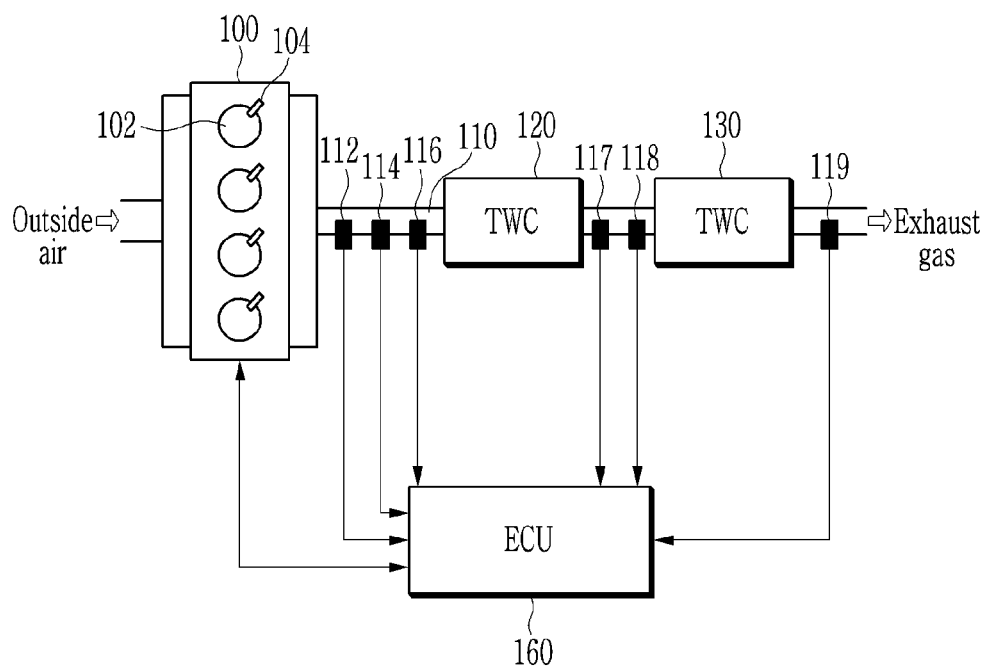
FIG. 1 is a schematic view showing the structure of an exhaust gas purification apparatus according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Exemplary embodiments of the present application will be described more fully hereinafter with reference to the accompanying drawings, in which exemplary embodiments of the present invention are shown. As those skilled in the art would realize, the described embodiments may be modified in various different ways, all without departing from the spirit or scope of the present invention.

Furthermore, in exemplary embodiments of the present invention, since like reference numerals designate like elements having the same configuration, various exemplary embodiments is representatively described, and in other exemplary embodiments of the present invention, only configurations different from the various exemplary embodiments will be described.

The drawings are schematic, and are not illustrated in accordance with a scale. Relative dimensions and ratios of portions in the drawings are illustrated to be exaggerated or reduced in size for clarity and convenience, and the dimensions are just exemplified and are not limiting. Furthermore, like structures, elements, or components illustrated in two or more drawings use same reference numerals for showing similar features. It will be understood that when an element such as a layer, film, region, or substrate is referred to as being "on" another element, it may be directly on the other element or intervening elements may also be present.

The exemplary embodiment of the present invention shows various exemplary embodiments of the present invention in detail. As a result, various modifications of the drawings will be expected. Therefore, the exemplary embodiment of the present invention is not limited to a specific aspect of the illustrated region, and for example, includes modifications of an aspect by manufacturing.

Now, an exhaust gas purification apparatus according to various exemplary embodiments of the present invention and method for controlling the same will be described with reference to the accompanying drawings.

FIG. 1 is a schematic view showing the structure of an exhaust gas purification apparatus according to various exemplary embodiments of the present invention.

In the instant case, the exhaust gas purifying apparatus is not limited to the present configuration, but only shows a schematic configuration necessary for explanation according to various exemplary embodiments of the present invention.

Referring to FIG. 1, the exhaust gas purification apparatus according to various exemplary embodiments of the present invention includes an internal combustion engine 100, a combustion chamber 102, an injector 104, an exhaust line 110, a three-way catalyst (TWC) 120, and a rear TWC 130, and a control unit (ECU) 160. Furthermore, an exhaust flow sensor 112, a first lambda sensor 114, and a first oxygen sensor 116 are provided between the internal combustion engine 100 and the front TWC 120 in the exhaust line 110. The order of arrangement of the exhaust flow sensor 112, the first lambda sensor 114, and the first oxygen sensor 116 is not limited to the exemplary embodiment of FIG. 1.

Furthermore, a second lambda sensor 117 and a second oxygen sensor 118 are provided in the exhaust line 110 between the front TWC 120 and the rear TWC 130, and the arrangement order is not limited to the exemplary embodiment of FIG. 1.

Furthermore, a third lambda sensor 119 is provided in the exhaust line 110 at the rear end portion of the TWC 130 to detect the air-fuel ratio of the exhaust gas discharged through the TWC 130 at the rear end portion.

Outside air is supplied to the combustion chamber 102 of the internal combustion engine 100, the injector 104 injects a set fuel amount into the combustion chamber 102 at a set time, and the burned exhaust gas is the front end TWC of the exhaust line 110 It is discharged to the outside through 120 and the TWC 130 at the rear end portion.

The front TWC 120 and the rear TWC 130 are mounted in the exhaust line 110 through which the exhaust gas discharged from the internal combustion engine 100 passes, and harmful substances including carbon monoxide, hydrocarbons and nitrogen oxides included in the exhaust gas Is converted into a harmless component by an oxidation-reduction reaction.

The exhaust flow sensor 112 is provided in the exhaust line 110 of the front TWC 120 and detects the flow rate of the exhaust gas. Furthermore, the first to third lambda sensors 114, 117, and 119 detect the lambda value of the exhaust gas passing through the exhaust line 110 and transmit the present signal to the control unit 160. Furthermore, the control unit 160 may control the injector 104 using the lambda value, and determine the fuel cut-off state of the injector 104 and the like.

The first oxygen sensor 116 and the second oxygen sensor 118 detect the oxygen concentration in the exhaust gas and transmit the oxygen concentration information to the control unit 160.

The control unit 160 determines the oxygen storage amount of the front TWC 120 and the rear TWC 130, and when the oxygen storage amount of the rear TWC 130 is greater than the target TWC oxygen storage amount of the rear end portion, it may be controlled to maintain the front TWC catalyst purge.

The control unit 160 determines the oxygen flow rate and the flow rate of the reducing agent flowing into the front TWC 120, determines the slip oxygen flow rate and the slip reducing agent flow rate of the front TWC 120, and determines the oxygen storage amount of the rear TWC 130. Furthermore, when the oxygen storage amount of the rear TWC 130 is greater than the target value of the rear TWC oxygen storage, the control unit 160 controls the rear TWC catalyst purge to be maintained.

For the present purpose, the control unit 160 may be implemented with one or more processors operating by a set program. The set program may be programmed to perform each step of the control method of the exhaust gas purification apparatus according to various exemplary embodiments of the present invention.

At the present time, the oxygen flow rate is determined based on the flow rate of the exhaust gas discharged from the combustion chamber 102 of the internal combustion engine 100 and the concentration of oxygen, and the reducing agent flow rate is discharged from the combustion chamber 102 of the internal combustion engine 100. It may be determined based on the flow rate and air-fuel ratio of the exhaust gas. The flow rate of the exhaust gas discharged from the combustion chamber 104 of the internal combustion engine 100 may be measured using the exhaust flow sensor 112, and the amount of oxygen in the exhaust gas discharged from the combustion chamber 102 of the internal combustion engine 100. The concentration may be measured by the first oxygen sensor 116. Furthermore, the air-fuel ratio of the exhaust gas discharged from the combustion chamber 102 of the internal combustion engine 100 may be set by the first lambda sensor 114.

Meanwhile, the oxygen storage amount of the front TWC 120 may be determined through time integration of the sum of the oxygen flow rate and the flow rate of the reducing agent flowing into the front TWC 120.

Furthermore, the oxygen storage amount of the rear TWC 130 may be determined from the time integral of a sum of the slip oxygen flow rate and the slip reducing agent flow rate of the front TWC 120 or the maximum oxygen storage amount of the rear TWC 130.

The process of determining the oxygen storage amount of the front TWC 120 and the oxygen storage amount of the rear TWC 130 will be described in detail below in the description of the exhaust gas purification apparatus control method.

Meanwhile, in the front TWC 120 and the rear TWC 130, the purifying performance of carbon monoxide and hydrocarbons may be improved in a lean atmosphere, and the purifying performance of nitrogen oxides may be improved in a rich atmosphere.

Furthermore, the front TWC 120 and the rear TWC 130 may be composed of one or more of ceria, zirconia, platinum, palladium, rhodium, zeolite, alumina, gold, titania, manganese, or a combination thereof, and may include a nitrogen oxide storage material.

Furthermore, the rear TWC 130 may be coated on a particulate matter filtering device to perform a function. The maximum oxygen storage amount of the TWC at the rear end portion may be set by multiplying the maximum oxygen storage amount of the TWC 120 at the front end portion by a volume ratio by setting the TWC oxygen storage capacity evaluation data at the rear end portion as a reference value, or if it has chemical/physical properties similar to that of the TWC 120 at the front end portion.

Figure 2:
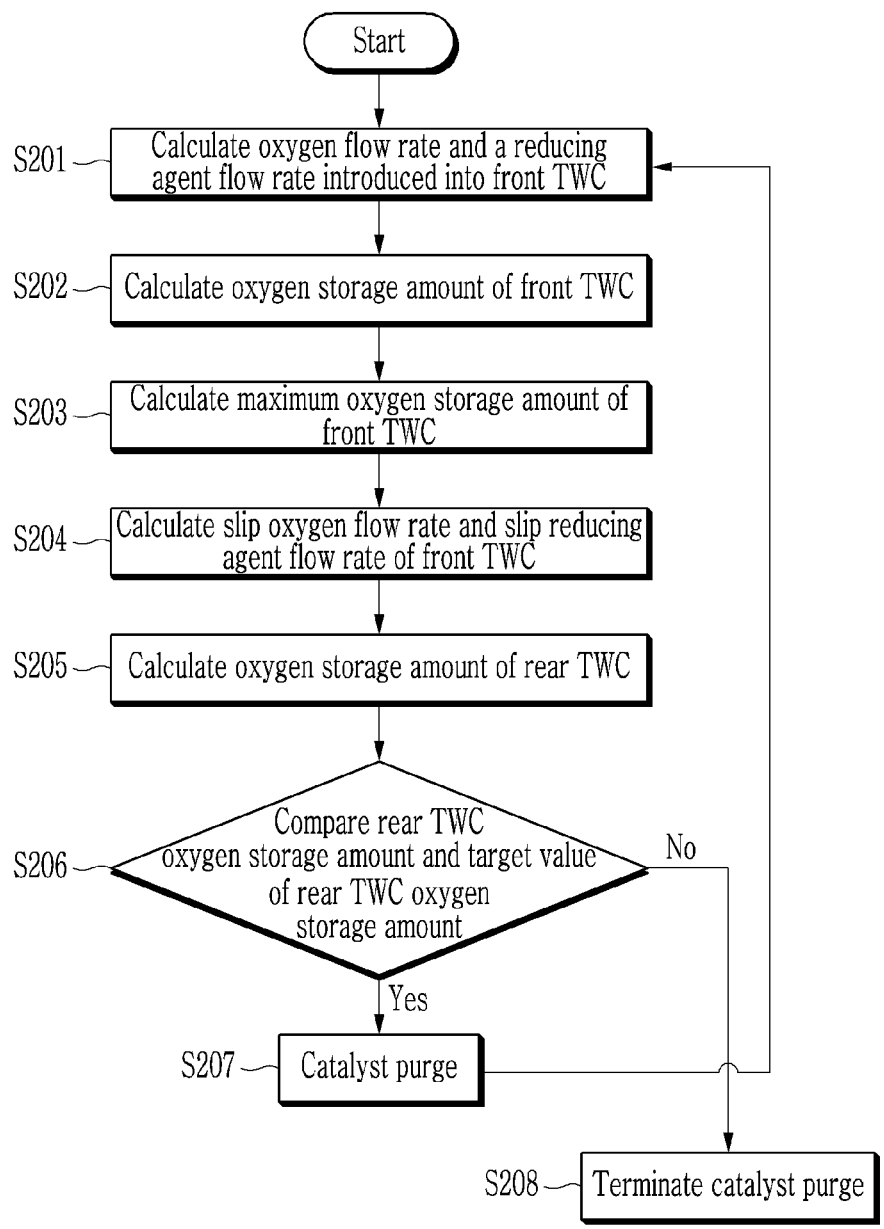
FIG. 2 is a flow chart showing a method for controlling an exhaust gas purification apparatus according to various exemplary embodiments of the present invention.

FIG. 2 is a flow chart showing a method for controlling an exhaust gas purification apparatus according to various exemplary embodiments of the present invention.

Referring to FIG. 2, in the method for controlling an exhaust gas purification apparatus according to various exemplary embodiments of the present invention, first, an oxygen flow rate ($m_{O2}$) and a reducing agent flow rate ($m_{red}$) introduced into the front TWC are determined S201.

At the present time, the oxygen flow rate ($m_{O2}$) is determined based on the flow rate (m) of the exhaust gas discharged from the combustion chamber of the internal combustion engine and the concentration of oxygen ($C_{O2}$), and the reducing agent flow rate ($m_{red}$) is determined based on the flow rate (m) of the exhaust gas discharged from the combustion chamber of the internal combustion engine and the air-fuel ratio ($\lambda$).

That is, the oxygen flow rate ($m_{O2}$) may be determined by the following equation (1), and the reducing agent flow rate ($m_{red}$) may be determined by the following [Equation 2].

$$m_{O2} = m \times C_{O2} \qquad \text{[equation 1]}$$

$$m_{red.} = m \times (1 - 1/\lambda) \qquad \text{[equation 2]}$$

At the present time, mO2 is the flow rate of the oxygen flowing into the front TWC, m is the flow rate of the exhaust gas discharged from the combustion chamber of the internal combustion engine, $C_{O2}$ is the concentration of oxygen released from the combustion chamber of an internal combustion engine, $m_{red}$ is the flow rate of reducing agent entering the front TWC, and $\lambda$ is the air-fuel ratio. and $C_{O2}$ may be replaced by the formula of $(1-1/\lambda)$, $m_{O2}$ always has a value greater than or equal to 0, and $m_{red}$ always has a value less than or equal to 0.

The flow rate (m) of the exhaust gas discharged from the combustion chamber of the internal combustion engine may be measured by an exhaust gas flow sensor provided in the exhaust line in the front end portion of the TWC, or may be determined through modeling by the control unit. The air-fuel ratio $\lambda$ of the exhaust gas discharged from the combustion chamber of the internal combustion engine is measured by a first lambda sensor that detects the air-fuel ratio of the exhaust gas. The concentration of oxygen ($C_{O2}$) discharged from the combustion chamber of the internal combustion engine may be measured by a first oxygen sensor provided in the exhaust line of the front TWC.

After that, the oxygen storage amount of the front TWC is determined based on the flow rate of oxygen flowing into the TWC and the flow rate of the reducing agent S202. In the instant case, the oxygen storage amount of the front TWC may be determined through time integration of the sum of the oxygen flow rate and the flow rate of the reducing agent flowing into the front TWC.

That is, when the air-fuel ratio ($\lambda_{WCC\ POST}$) of the front TWC and the rear end portion is equal to or less than 1, the oxygen storage amount ($m_{O2,\ WCC}$) of the front TWC is determined as the time integral of the sum of the oxygen flow rate ($m_{O2}$) and the reducing agent flow rate ($m_{red}$) flowing into the front TWC (Equation 3). In the instant case, the air-fuel ratio $\lambda$ may be measured by a second lambda sensor provided in the exhaust line at the rear end portion of the TWC in the front end portion.

This may be expressed as Equation 3 below.

$$m_{O2,WCC} = \int \dot{m}_{O2} + \dot{m}_{red.} dt, if \lambda_{WCC\ POST} \leq 1 \qquad \text{[equation 3]}$$

This is based on the fact that when a lean atmosphere is detected at the position of the second oxygen sensor, it may be determined that the front end TWC is saturated with oxygen. However, since oxygen in the TWC may be removed by the reducing agent supplied from the combustion chamber of the internal combustion engine, the front TWC can store oxygen supplied from the combustion chamber of the internal combustion engine again. As a result, when a lean atmosphere is detected at the position of the second oxygen sensor, most of the oxygen supplied from the combustion chamber of the internal combustion engine is supplied to the rear TWC.

Thereafter, the maximum oxygen storage amount of the front TWC is determined S203. At the instant time, the maximum oxygen storage amount ($OSA_{WCC,max}$) of the front TWC is determined as the oxygen storage amount of the front TWC at the moment when the oxygen sensor signal provided at the rear end portion of the front TWC exceeds the air-fuel ratio 1.

In an adjacent step, the slip oxygen flow rate and the slip reducing agent flow rate of the front TWC are determined S204.

The slip oxygen flow rate ($m_{O2,\ UCC}$) of the front TWC is determined as the oxygen flow rate ($m_{O2}$) flowing into the front TWC when the air-fuel ratio ($\lambda_{WCC\ POST}$) at the rear end portion of the front TWC is greater than 1, and determined as 0 when the air-fuel ratio ($\lambda_{WCC\ POST}$) at the rear of the front TWC is not greater than 1.

This may be expressed as Equations 4 and 5 below.

$$\dot{m}_{O_2,UCC}=\dot{m}_{O_2}, \text{ if } \lambda_{WCC\ POST}>1 \qquad \text{[equation 4]}$$

$$\dot{m}_{O_2,UCC}=0, \text{ if } \lambda_{WCC\ POST}\leq 1 \qquad \text{[equation 5]}$$

Furthermore, the flow rate of the slip reducing agent ($m_{red,\ UCC}$) of the front TWC is determined as the flow rate of the reducing agent flowing into the front TWC ($m_{red}$) if the oxygen storage amount ($m_{O2,\ WCC}$) of the front TWC is not greater than the oxygen storage amount ($m_{O2,\ WCC,\ set}$) of the front TWC. The slip reducing agent flow rate ($m_{red,\ UCC}$) of the front TWC is determined as 0 when the front TWC oxygen storage amount ($m_{O2,\ WCC}$) is greater than the reference oxygen storage amount ($m_{O2,\ WCC,\ set}$).

This may be expressed as Equations 6 and 7 below.

$$\dot{m}_{red.,UCC}=\dot{m}_{red.}, \text{ if } m_{O_2,WCC}\leq m_{O_2,WCC,set} \qquad \text{[equation 6]}$$

$$\dot{m}_{red.,UCC}=0, \text{ if } m_{O_2,WCC}>m_{O_2,WCC,set} \qquad \text{[equation 7]}$$

At the present time, the reference oxygen storage amount may be set as the maximum oxygen storage amount of the front TWC.

After that, the oxygen storage amount of the rear TWC is determined S205. At the instant time, the oxygen storage amount ($m_{O2,UCC}$) of the rear TWC is the time integral of the sum of the slip oxygen flow rate ($m_{O2,UCC}$) of the front TWC and the flow rate of slip reducing agent ($m_{red,\ UCC}$), or the oxygen storage target value ($OSA_{UCC,\ max}$).

If the oxygen storage amount ($m_{O2,UCC}$) of the TWC at the rear end portion thereof is not greater than the maximum oxygen storage amount ($OSA_{UCC,max}$) of the TWC at the rear end portion, the slip oxygen flow rate ($m_{O2,UCC}$) and the slip reducing agent of the TWC at the front end portion It is determined as the time integral of the sum of the flow rates ($m_{red,\ UCC}$). The oxygen storage amount ($m_{O2,UCC}$) of the TWC at the rear end portion thereof is determined as the maximum oxygen storage amount of the TWC at the rear end portion ($OSA_{UCC,max}$) if the oxygen storage amount ($m_{O2,UCC}$) of the TWC at the rear end portion thereof is greater than the maximum oxygen storage amount at the TWC ($OSA_{UCC,max}$).

This may be expressed as Equations 8 and 9 below.

$$m_{O_2,UCC}=\int \dot{m}_{O_2,UCC}+\dot{m}_{red.,UCC}dt, \text{ if } m_{O_2,UCC}\leq O\text{-}SA_{UCC,max}. \qquad \text{[equation 8]}$$

$$m_{O_2,UCC}=OSA_{UCC,max}, \text{ if } m_{O_2,UCC}>OSA_{UCC,max}. \qquad \text{[equation 9]}$$

Accordingly, the rear TWC oxygen storage amount and the target value of the rear TWC oxygen storage amount are compared S206, and if the TWC oxygen storage amount ($m_{O2,\ UCC}$) at the rear end portion thereof is greater than the target value ($OSA_{UCC,\ max}$) of the TWC oxygen storage at the end portion, the catalyst purge is maintained 5207, and the TWC oxygen storage amount at the rear end portion ($m_{O2,\ UCC}$) is the TWC oxygen storage target at the rear end portion. If it is not greater than the value ($OSA_{UCC,max}$), the catalyst purging is terminated S208.

Like this, according to various exemplary embodiments of the present invention, it is possible to improve the exhaust gas purification performance of the internal combustion engine by predicting the amount of oxygen and reducing agent flowing into the rear TWC, purging the catalyst based on this, and controlling the catalyst to end portion purging based on the information on the air-fuel ratio received from the rear oxygen sensor and the amount of oxygen stored in the rear TWC.

Furthermore, the term "controller", "control unit" or "control device" refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The controller according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors.

The controller or the control unit may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a controller, and the controller may be configured by a plurality of controllers, or an integrated single controller.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method for controlling an exhaust gas purification apparatus including a front three-way catalyst (TWC) and a rear TWC that purify an exhaust gas discharged from an engine, the method comprising:
   determining an oxygen flow rate and a flow rate of a reducing agent introduced into the front TWC;
   determining an oxygen storage amount of the front TWC according to the oxygen flow rate and the flow rate of the reducing agent flowing into the front TWC;
   determining a maximum oxygen storage amount of the front TWC;
   determining a slip oxygen flow rate and a slip reducing agent flow rate of the front TWC;
   determining an oxygen storage amount of the rear TWC;
   comparing the oxygen storage amount of the rear TWC and a target value of the rear TWC oxygen storage amount; and
   maintaining a catalyst purge of the front TWC when the oxygen storage amount of the rear TWC is greater than the target value of the rear TWC oxygen storage amount.

2. The method of claim 1, wherein
   in the determining an oxygen flow rate and a flow rate of a reducing agent introduced into the front TWC,
   the oxygen flow rate is determined according to a flow rate of the exhaust gas discharged from a combustion chamber of the engine and a concentration of oxygen, and
   the flow rate of the reducing agent is determined according to the flow rate of the exhaust gas and an air-fuel ratio of the exhaust gas discharged from the combustion chamber of the engine.

3. The method of claim 2, wherein
   the oxygen flow rate is determined by the following [Equation 1], and
   the flow rate of the reducing agent is determined by the following [Equation 2], $$m_{O2} = m \times C_{O2} \quad \text{[equation 1]}$$

$$m_{red.} = m \times (1 - 1/\lambda) \quad \text{[equation 2]}$$

wherein, mO2 is the flow rate of the oxygen flowing into the front TWC, m is the flow rate of the exhaust gas discharged from the combustion chamber of the engine, $C_{O2}$ is the concentration of oxygen discharged from the combustion chamber of the engine, $m_{red}$ is the flow rate of the reducing agent entering the front TWC, and $\lambda$ is the air-fuel ratio, and
   wherein $C_{O2}$ is replaceable with an equation of $(1-1/\lambda)$, $m_{O2}$ has a value greater than or equal to 0, and $m_{red.}$ has a value less than or equal to 0.

4. The method of claim 1, wherein in determining the oxygen storage amount of the front TWC, the oxygen storage amount of the front TWC is determined through time integration of a sum of the oxygen flow rate and the flow rate of the reducing agent introduced into the front TWC when an air-fuel ratio of a rear end portion of the front TWC is equal to or less than 1.

5. The method of claim 1, wherein
   in the determining a maximum oxygen storage amount of the front TWC, the maximum oxygen storage amount of the front TWC is determined as the oxygen storage amount of the front TWC when a signal of an oxygen sensor installed at a rear end portion of the front TWC exceeds 1 air-fuel ratio.

6. The method of claim 1, wherein in the determining a slip oxygen flow rate and a slip reducing agent flow rate of the front TWC, the slip oxygen flow rate of the front TWC is determined as the oxygen flow rate introduced into the front TWC when an air-fuel ratio of a rear end portion of the front TWC is greater than 1, and is determined as 0 when the air-fuel ratio at the rear end portion of the front TWC is not greater than 1.

7. The method of claim 1, wherein in the determining a slip oxygen flow rate and a slip reducing agent flow rate of the front TWC, the slip reducing agent flow rate of the front TWC is determined as the flow rate of the reducing agent introduced into the front TWC when the oxygen storage amount in the front TWC is not greater than a reference oxygen storage amount, and is determined as 0 when the oxygen storage amount of the front TWC is greater than the reference oxygen storage amount.

8. The method of claim 7, wherein the reference oxygen storage amount is set as a maximum oxygen storage amount of the front TWC.

9. The method of claim 1, wherein in determining an oxygen storage amount of the rear TWC, the oxygen storage amount of the rear TWC is determined as a time integral of a sum of the slip oxygen flow rate and the slip reducing agent flow rate of the front TWC or a maximum oxygen storage amount of the rear TWC.

10. The method of claim 9, wherein the oxygen storage amount of the rear TWC is determined as a time integral of the sum of the slip oxygen flow rate of the front TWC and the slip reducing agent flow rate when the oxygen storage amount of the rear TWC is not greater than a target value of the rear TWC oxygen storage amount, and is determined as a maximum oxygen storage amount of the rear TWC when the oxygen storage amount of the rear TWC is greater than the target oxygen storage amount of the rear TWC.

11. The method of claim 1, wherein the target value of the rear TWC oxygen storage is set to a level of 5-70% of a maximum oxygen storage of the rear TWC, and is set differently according to operation conditions of the engine, catalyst temperature, and exhaust flow rate.

12. The method of claim 1, wherein in the front TWC and the rear TWC, purifying performance of carbon monoxide and hydrocarbons is improved in a lean atmosphere, and purifying performance of nitrogen oxides is improved in a rich atmosphere.

13. The method of claim 1, wherein the front TWC and the rear TWC are composed of one or more of ceria, zirconia, platinum, palladium, rhodium, zeolite, alumina, gold, titanic, manganese, or a combination thereof.

14. The method of claim 1, wherein a rear TWC maximum oxygen storage amount is set as a reference value according to rear TWC oxygen storage capacity evaluation data, or is set by multiplying the maximum oxygen storage amount of the front TWC by a volume ratio.

15. An exhaust gas purification apparatus including a three-way catalyst (TWC) that purifies an exhaust gas discharged from an engine, the exhaust gas purification apparatus including:
- a first oxygen sensor mounted in an exhaust line at a rear end portion of a combustion chamber of the engine;
- a front TWC mounted in the exhaust line at a rear end portion of the first oxygen sensor;
- a second oxygen sensor mounted in the exhaust line at a rear end portion of the front TWC;
- a rear TWC mounted in the exhaust line at a rear end portion of the second oxygen sensor; and
- a control unit configured of determining an oxygen storage amount of the front TWC and an oxygen storage amount of the rear TWC, and controlling to maintain a front TWC catalyst purge when the oxygen storage amount of the rear TWC is greater than a target value of the oxygen storage amount of the rear TWC.

16. The exhaust gas purification apparatus of claim 15, further including:
- an exhaust gas flow sensor mounted in the exhaust line in front of the front TWC to detect a flow rate of the exhaust gas and a first oxygen sensor to detect an air-fuel ratio of the exhaust gas; and
- a second oxygen sensor mounted in the exhaust line at the rear end portion of the front TWC to detect an oxygen concentration of the exhaust gas.

17. The exhaust gas purification apparatus of claim 16, wherein the flow rate of the exhaust gas is determined through modeling by the control unit.

18. The exhaust gas purification apparatus of claim 15, wherein the control unit is configured:
- to determine a flow rate of oxygen and a flow rate of a reducing agent introduced into the front TWC,
- to determine a slip oxygen flow rate and a slip reducing agent flow rate of the front TWC,
- to determine the oxygen storage amount of the rear TWC, and
- to control to maintain a front TWC catalyst purge when the oxygen storage amount of the rear TWC is greater than the target value of the oxygen storage amount of the rear TWC.

19. The exhaust gas purification apparatus of claim 18,
wherein the flow rate of the oxygen is determined according to a flow rate of the exhaust gas discharged from a combustion chamber of the engine and a concentration of the oxygen, and
wherein the flow rate of the reducing agent is determined according to the flow rate of the exhaust gas and an air-fuel ratio of the exhaust gas discharged from the combustion chamber of the engine.

20. The exhaust gas purification apparatus of claim 15, wherein the oxygen storage amount of the front TWC is determined by time integration of a sum of the flow rate of the oxygen and the flow rate of the reducing agent flowing into the front TWC.

21. The exhaust gas purification apparatus of claim 15, wherein the oxygen storage amount of the rear TWC is determined as a time integral of a sum of a slip oxygen flow rate and a slip reducing agent flow rate of the front TWC or a the target value of the oxygen storage amount of the rear TWC.

22. The exhaust gas purification apparatus of claim 15, wherein the target value of the rear TWC oxygen storage is set to a level of 5-70% of a maximum oxygen storage of the rear TWC, and is set differently according to operation conditions of the engine, catalyst temperature, and exhaust flow rate.

23. The exhaust gas purification apparatus of claim 15, wherein in the front TWC and the rear TWC, purifying performance of carbon monoxide and hydrocarbons is improved in a lean atmosphere, and purifying performance of nitrogen oxides is improved in a rich atmosphere.

24. The exhaust gas purification apparatus of claim 15, wherein the front TWC and the rear TWC are composed of one or more of ceria, zirconia, platinum, palladium, rhodium, zeolite, alumina, gold, titania, manganese, or a combination thereof.

25. The exhaust gas purification apparatus of claim 15, wherein the front TWC and the rear TWC include a nitrogen oxide storage material.

26. The exhaust gas purification apparatus of claim 15, wherein the rear TWC performs a function by being coated on a particulate matter filter device.

27. The exhaust gas purification apparatus of claim 15, wherein a rear TWC maximum oxygen storage amount is set as a reference value according to rear TWC oxygen storage capacity evaluation data, or is set by multiplying a maximum oxygen storage amount of the front TWC by a volume ratio.

* * * * *